(12) United States Patent
Dünisch et al.

(10) Patent No.: US 6,906,513 B2
(45) Date of Patent: Jun. 14, 2005

(54) ROTARY MOTION DETECTOR

(75) Inventors: Paul Dünisch, Burglauer (DE); Roland Finkler, Erlangen (DE); Andreas Kuhn, Erlangen (DE); Christoph Nolting, Hallerndorf (DE); Günter Schwesig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 115 days.

(21) Appl. No.: 10/425,999

(22) Filed: Apr. 29, 2003

(65) Prior Publication Data

US 2003/0227286 A1 Dec. 11, 2003

(30) Foreign Application Priority Data

Apr. 29, 2002 (DE) .......................................... 102 19 091

(51) Int. Cl.$^7$ .............................. G01B 7/30; G01P 3/46; G01P 3/52
(52) U.S. Cl. .................................. 324/207.25; 324/164
(58) Field of Search ........................... 324/207.25, 164, 324/207.2, 207.21, 207.12, 207.13, 207.15, 160, 163, 179, 180, 222; 33/1 N, 1 PT

(56) References Cited

U.S. PATENT DOCUMENTS

| | | | | |
|---|---|---|---|---|
| 3,178,641 A | * | 4/1965 | Varterasian | ................. 324/164 |
| 3,281,682 A | | 10/1966 | Bauerlein | |
| 4,095,177 A | * | 6/1978 | Harris | ......................... 324/164 |
| 4,259,637 A | * | 3/1981 | Bloomfield et al. | ......... 324/166 |
| 4,764,767 A | * | 8/1988 | Ichikawa et al. | ...... 340/870.31 |
| 5,141,158 A | * | 8/1992 | Allen | ........................... 239/252 |
| 5,825,187 A | * | 10/1998 | Ohashi et al. | ............... 324/319 |
| 6,016,605 A | * | 1/2000 | Hecht | ........................... 33/1 PT |
| 6,271,663 B1 | * | 8/2001 | Kanbe et al. | .......... 324/207.21 |
| 6,282,961 B1 | * | 9/2001 | D'Amico et al. | ......... 73/514.39 |
| 6,672,175 B2 | * | 1/2004 | Jin et al. | ............... 73/862.326 |
| 2002/0190709 A1 | * | 12/2002 | Frederick et al. | ......... 324/207.2 |
| 2004/0145363 A1 | * | 7/2004 | Finkler | ........................ 324/164 |

FOREIGN PATENT DOCUMENTS

| | | |
|---|---|---|
| DE | 15 23 221 | 4/1969 |
| DE | 37 30 841 A1 | 3/1988 |
| DE | 37 44 122 A1 | 7/1989 |
| DE | 41 23 128 A1 | 1/1993 |
| DE | 44 39 233 A1 | 7/1995 |
| DE | 100 08 765 C1 | 8/2001 |
| DE | 100 47 675 A1 | 4/2002 |
| FR | 1 020 474 | 2/1953 |
| FR | 1 232 969 | 10/1960 |

OTHER PUBLICATIONS

Publication by G. Behr, Zeitschrift für Messen, Regeln und Steuern (*Journal for Measurement and Control*), vol. 8, 1959, pp. 355–360.

* cited by examiner

*Primary Examiner*—Edward Lefkowitz
*Assistant Examiner*—Kenneth Whittington
(74) *Attorney, Agent, or Firm*—Henry M. Feiereisen

(57) ABSTRACT

A rotary motion detector includes an electrically conducting induction element formed essentially as a hollow cylinder and rotatable about a rotation axis. An excitation assembly applies an inhomogeneous magnetic field and induces an eddy current in the induction element, when the induction element rotates about the rotation axis. A sensor assembly detects a measurement signal that depends on the eddy current. The excitation assembly and the sensor assembly are both arranged radially inside the induction element.

9 Claims, 4 Drawing Sheets

ROTARY MOTION DETECTOR

CROSS-REFERENCES TO RELATED APPLICATIONS

This application claims the priority of German Patent Application, Serial No. 102 19 091.7, filed Apr. 29, 2002, pursuant to 35 U.S.C. 119(a)–(d), the disclosure of which is incorporated herein by reference.

BACKGROUND OF THE INVENTION

The present invention relates to a rotary motion detector, and more particularly, to a rotary motion detector which produces a large signal while requiring only a small installation space.

Rotary motion detectors with an excitation assembly, an electrically conducting induction element and a sensor assembly are generally known in the art. The induction element is essentially formed as a hollow cylinder and rotatable about a rotation axis, with an inhomogeneous magnetic field being applied to the induction element by the excitation assembly. When the induction element rotates about the rotation axis, an eddy current is induced in the induction element. The sensor assembly measures a measurement signal that depends on the eddy current.

Rotary motion detectors of this type are described, for example, in German Pat. No. DE 100 08 765 C1 and French Pat. No. FR 1 232 969. In the rotary motion detector of FR 1 232 969, both the excitation assembly and the sensor assembly are arranged radially outside the induction element. The rotary motion detector of French Pat. No. FR 1 232 969 is therefore relatively compact, but produces only a comparatively small measurement signal. In the rotary motion detector disclosed in German Pat. No. DE 100 08 765 C1, either the excitation assembly or the sensor assembly are arranged radially inside the induction element. The corresponding other assembly, i.e. the sensor assembly or the excitation assembly, is arranged radially outside the induction element. The rotary motion detector of German Pat. No DE 100 08 765 C1 therefore requires a relatively large installation space.

It would therefore be desirable and advantageous to provide an improved rotary motion detector, which obviates prior art shortcomings and is compact while still producing a large measurement signal.

SUMMARY OF THE INVENTION

According to an aspect of the invention, a rotary motion detector includes an electrically conducting induction element formed as a hollow cylinder and rotatable about a rotation axis, an excitation assembly applying an inhomogeneous magnetic field to the induction element, and a sensor assembly, wherein the excitation assembly and the sensor assembly are disposed radially inside the induction element, and wherein during a rotation of the induction element about the rotation axis an eddy current is induced in the induction element, with the sensor assembly acquiring a measurement signal in response to the eddy current.

A compact construction is achieved by placing the assemblies inside the induction element, so that the rotary motion detector can have a greater diameter than conventional detectors, while keeping the total volume of the rotary motion detector unchanged. The product of angular velocity and radius, which determines the signal level, is therefore greater than with conventional detectors.

The excitation assembly can either be formed as a permanent magnet assembly or as a coil arrangement. Either a DC current or an AC current can be supplied to the coil arrangement. AC operation is described, for example, in the publication by G. Behr, Zeitschrift für Messen, Regeln und Steuern (*Journal for Measurement and Control*), Vol. 8, 1959, pp. 355–360.

Likewise, the sensor assembly can be implemented either as a coil arrangement or as a sensor assembly which can measure a magnetic field produced by the eddy current. An exemplary sensor assembly is a Hall sensor assembly, which is described, for example, in German Pat. Nos. DE 37 30 841 A1 and DE 41 23 128 A1.

According to another feature of the present invention, the rotary motion detector may include a shunt element, which is spaced from the rotation axis at a distance which is equal or greater than the distance between the induction element and the rotation axis. The shunt element can guide the magnetic field from an exit zone to an entry zone of the excitation assembly, thereby increasing the measurement signal from the sensor assembly.

Advantageously, the shunt element can be identical to the induction element, or can be spaced at a greater distance from the rotation axis than the induction element. The shunt element can be connected in fixed rotative engagement with the induction element or to be relatively non-rotatable to the excitation assembly. If the shunt element is connected in fixed rotative engagement with the induction element, then the shunt element can be adjacent to the induction element in the radial direction.

According to another feature of the present invention, the shunt element can be electrically insulating, for example can be made of a soft magnetic composite powder material. Alternatively, the shunt element can also be made of an electrically conductive material, e.g. steel. When the shunt element is electrically conductive, it is preferably constructed so as to suppress an induction of eddy currents in the shunt element.

The shunt element can be constructed, for example, of laminated metal sheets which are electrically isolated from each other. Alternatively, the shunt element can also be made, for example, of a granular ferrite material or a coil winding.

According to another feature of the invention, the rotation position of the induction element can be measured directly by measuring the rotation speed and/or the rotation acceleration of the induction element. According to one embodiment, the induction element can be connected in fixed rotative engagement with a material measure, i.e. a body with material markers, which can be implemented, for example, mechanically, magnetically, optically and the like. The material marker can be scanned by a sensor head. The sensor head can be connected in fixed rotative engagement with the excitation assembly, and the rotational position of the induction element can be acquired based on an output signal from the sensor head.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
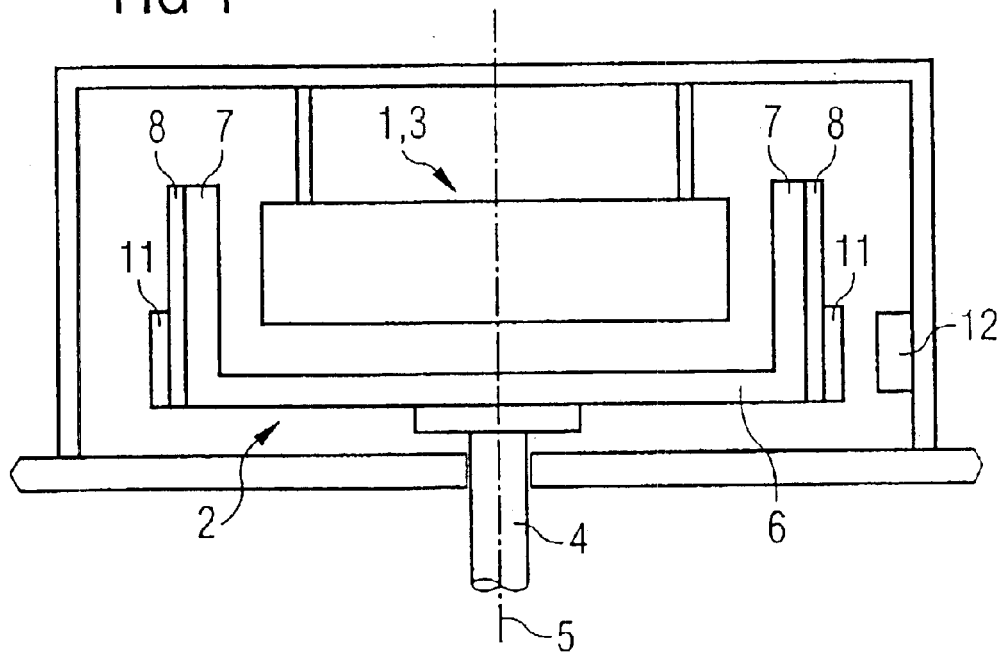
FIG. 1 is a cross-sectional side view of a first embodiment of a rotary motion detector according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a cross-sectional side view of a first embodiment of a rotary motion detector according to the present invention, including an excitation assembly 1, a rotating element 2 and a sensor assembly 3. The rotating element 2 is connected in fixed rotative engagement with a shaft 4, allowing the rotating element 2 to rotate in unison with the shaft 4 about a rotation axis 5. The rotating element 2 is cup-shaped and has a bottom 6 and an electrically conducting induction element 7 which is substantially formed as a hollow cylinder, as shown in particular in FIG. 2.

The excitation assembly 1 can be used to apply an inhomogeneous magnetic field to the induction element 7. When the rotating element 2 rotates about the rotation axis 5, an eddy current is induced in the induction element 7. A measurement signal, which depends on the eddy current, can be detected by the sensor assembly 3.

Figure 2:
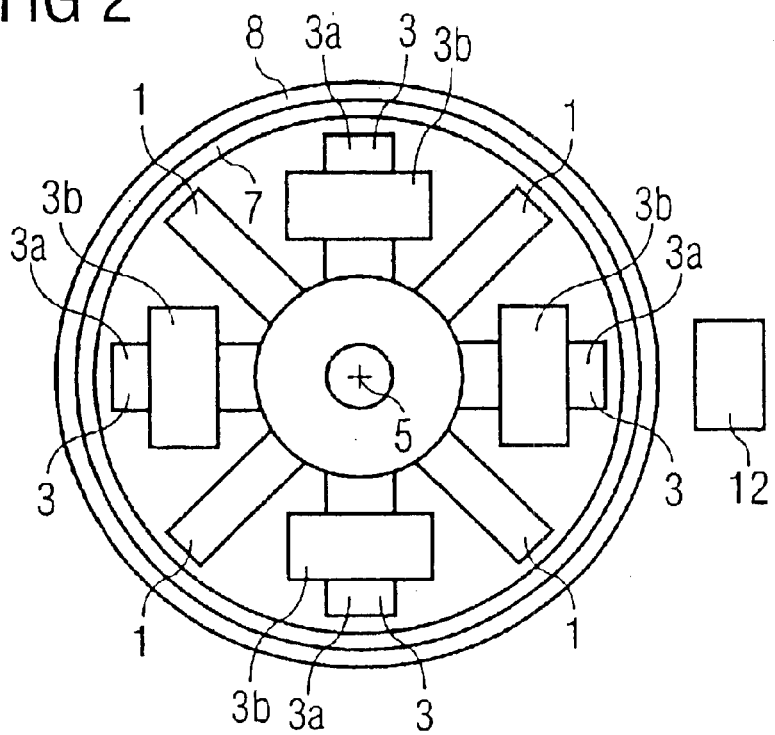
FIG. 2 is a top view of the rotary motion detector of FIG. 1.

The aforedescribed mode of operation is generally known from Ferraris sensors and will therefore not be described in detail. Although the detector has a compact construction, a large measurement signal can be generated because, as shown in FIGS. 1 and 2, both the excitation assembly 1 and the sensor assembly 3 are disposed radially inside the induction element 7. The measurement signal depends not only on the magnetic field and the angular velocity and/or its time derivative, but also on the distance between the induction element 7 and the rotation axis 5.

In accordance with FIG. 2, the excitation assembly 1 is implemented as a permanent magnet assembly. The sensor assembly 3 is implemented as a coil arrangement which includes coil cores 3a and coil windings 3b. The coil cores 3a can optionally be combined into a single component.

Figure 3:
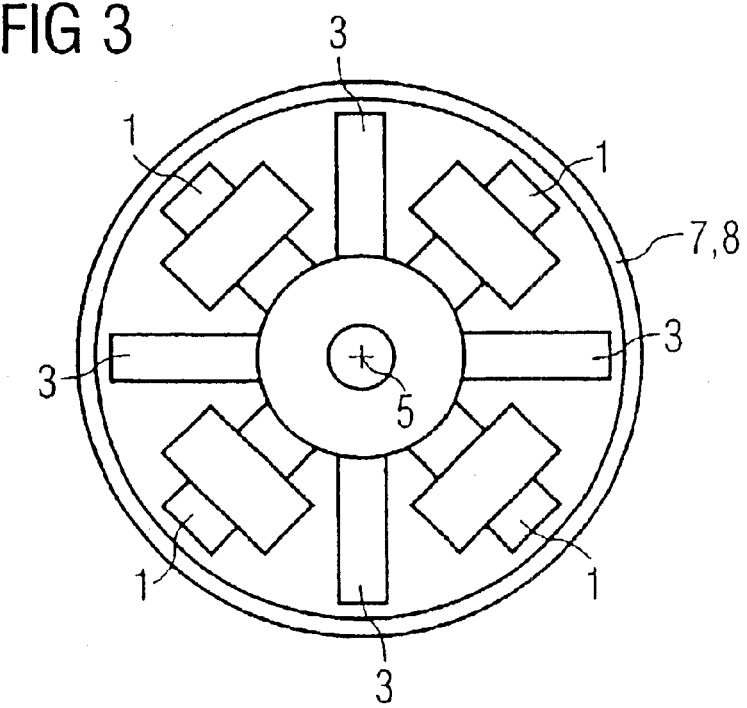
FIG. 3 is a top view of a second embodiment of a rotary motion detector according to the present invention.

FIG. 3 shows a top view of another embodiment of a rotary motion detector according to the present invention. Parts corresponding with those in FIGS. 1 and 2 are denoted by identical reference numerals and not explained again. In this embodiment, the excitation assembly 1 is configured as a coil arrangement, to which a DC current or an AC current can be applied. The sensor assembly 3 is implemented as a Hall sensor capable of measuring a magnetic field produced by the eddy currents.

The embodiments depicted in FIGS. 2 and 3 can be combined in any desired manner. In particular, both the excitation assembly 1 and the sensor assembly 3 can be constructed as a coil arrangement. As an alternative, the excitation assembly 1 can be realized as a permanent magnet arrangement and the sensor assembly 3, for example, as Hall sensors.

In the embodiments of FIGS. 2 and 3, the rotary motion detector can include a shunt element 8 which can be made of a magnetically conductive material. The magnetic field can therefore be guided by the shunt element 8 from exit zones 9 to entry zones 10 of the excitation assembly 1. According to FIG. 2, the shunt element 8 is radially spaced at a greater distance from the rotation axis 5 than the induction element 7 and is connected the induction element 7 in fixed rotative engagement with the induction element 7. Thus, the shunt element 8 can, for example, radially adjoin the induction element 7.

It is even possible, as shown in FIG. 3, that the shunt element 8 is identical to the induction element 7. In this case, the shunt element 8 has a radial distance from the rotation axis 5 that is equal to the radial distance of the induction element 7 from the rotation axis 5.

Figure 4:
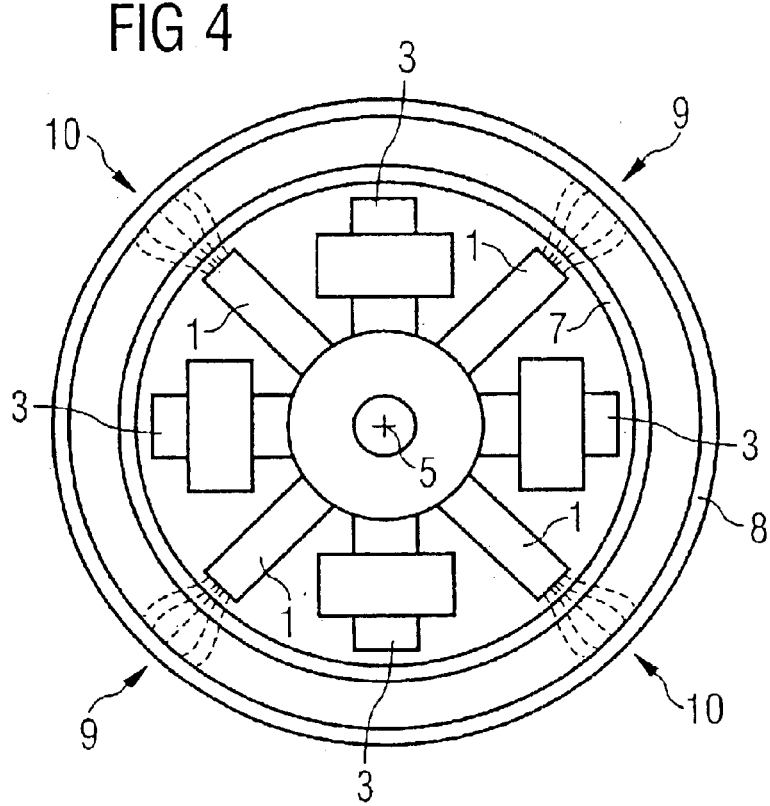
FIG. 4 is a top view of a third embodiment of a rotary motion detector according to the present invention.

FIG. 4 shows another variation of a rotary motion detector according to the present invention, in which, like the rotary motion detector of FIG. 2, the shunt element 8 is placed at a greater radial distance from the rotation axis 5 than the induction element 7. The shunt element 8 is herein arranged in fixed rotative engagement with the excitation assembly 1.

Except for a situation where the shunt element 8 is identical to the induction element 7, the magnetic conductivity and not the electrical conductivity of the shunt element 8 is relevant. The shunt element 8 can therefore be electrically insulating. For example, the shunt element 8 can be constructed of a soft-magnetic composite powder material. In general, the shunt element 8 can be configured independent of the construction of the excitation assembly 1 and the sensor assembly 3.

Figure 5:
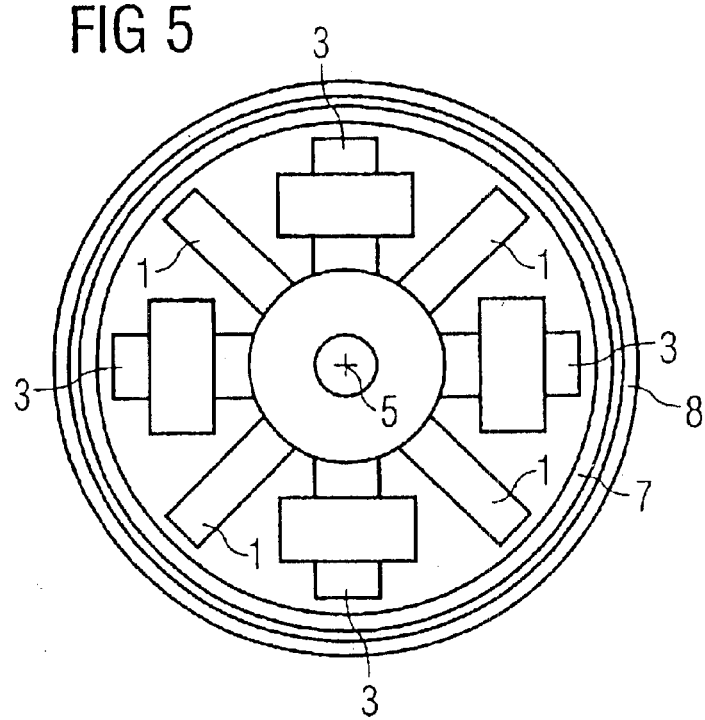
FIG. 5 is a top view of a fourth embodiment of a rotary motion detector according to the present invention.

As shown in FIGS. 1 and 2, the induction element 7 can be connected in fixed rotative engagement with a material marker 11. The material marker 11 can be scanned with a sensor head 12, which is arranged so as to rotate with the excitation assembly 1. A rotational position of the rotating element 2 can be determined based on an output signal from the sensor head 12. The material marker 11 can be configured in various ways. For example, the material marker 11 can be realized as an optical or magnetic material marker 11, in which case the sensor head 12 would be implemented either as optical or magnetic sensor head 12. A magnetic material marker 11 should preferably, but not necessarily, be shielded from the magnetic field of the excitation assembly 1 by the shunt element 8. It will be understood by persons skilled in the art that the configuration of the material marker 11 and the sensor head 12 is independent of the construction of the excitation assembly 1 and the sensor assembly 3. In the event of a magnetic material marker, care should be taken to eliminate the presence of any undesirable interactions It is, however, also conceivable to omit the material marker 11 and the sensor head 12 altogether, as shown by way of example in FIG. 5.

When the shunt element 8 is made of an electrically conducting material, it should preferably be configured so as to suppress eddy currents induced in the shunt element 8. This can be achieved in various ways, as will now be described with reference to FIGS. 6 to 8.

Figure 6:
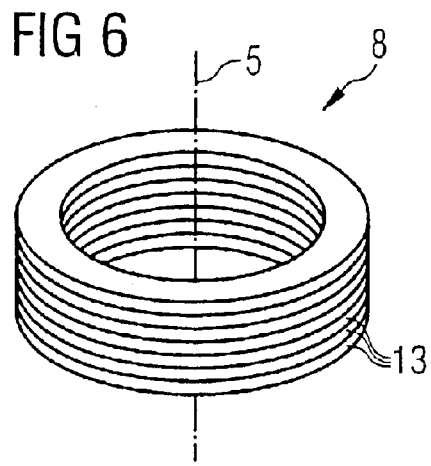
FIGS. 6 to 8 show perspective illustrations of various shunt elements.

According to FIG. 6, the shunt element 8 can be made of a stack of metal sheets 13 which are electrically isolated from each other. The sheets 13 are preferably stacked in an axial direction.

Figure 7:
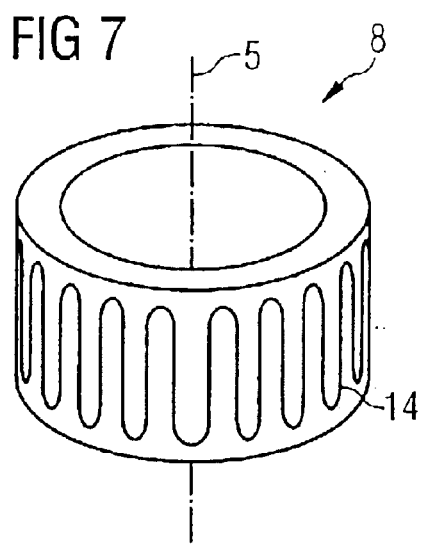
Figure 8:
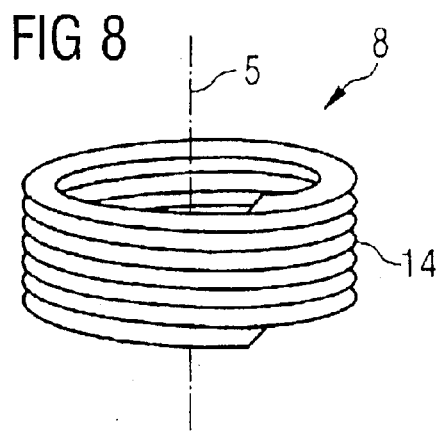

FIG. 7 depicts a shunt element 8 made of a winding 14 of insulating wire. The winding 14 extends essentially in an axial direction and gradually migrates in a tangential direction about the rotation axis 5. In other words, the winding 14 describes a meander pattern. The winding 14 is made preferably of a magnetically conducting material, e.g. steel.

Alternatively, the wire winding 14 can also be formed in a manner as to extend tangentially around the rotation axis 5. Also in this case is it possible to realize a meander-type winding structure. The wire winding 14 may, however, also be continuous and extend in a circular pattern about the rotation axis 5. Of course any combinations thereof are conceivable as well.

The configuration of the shunt element 8 is independent as to whether the shunt element 8 is arranged in fixed rotative engagement with the induction element 7, or whether the shunt element 8 is arranged in fixed rotative engagement with the, excitation assembly 1. The configuration of the shunt element 8 is also independent of the configuration of the excitation assembly 1 and the sensor assembly 3.

Like the shunt element 8, the coil cores 3a are also preferably configured so as to suppress eddy currents in the coil cores 3a. Accordingly, the coil cores 3a should be made either of a material that is magnetically conductive and electrically insulating, or of a material that is both magnetically and electrically conductive. In the latter case, the coil cores 3a are preferably configured so as to suppress the induction of eddy currents in the coil cores 3a. The coil cores 3a can be made, for example, of a stack of mutually insulated metal sheets which are stacked in the axial direction.

A compact rotary motion detector according to the present invention is simple in construction and provides large measurement signals through arrangement of both the excitation assembly 1 and the sensor assembly 3 radially inside the induction element 7.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A rotary motion detector, comprising:

an electrically conducting induction element formed as a hollow cylinder and rotatable about a rotation axis;

an excitation assembly disposed radially inside the induction element and applying an inhomogeneous magnetic field to the induction element;

a sensor assembly disposed radially inside the induction element, and a shunt element made of a wire winding and spaced from the rotation axis at a distance that is greater than a distance between the induction element and the rotation axis, said shunt element guiding the magnetic field from an exit zone to an entry zone of the excitation assembly and configured to suppress induction of eddy currents in the shunt element, wherein during a rotation of the induction element about the rotation axis an eddy current is induced in the induction element, with the sensor assembly acquiring a measurement signal in response to the eddy current.

2. The detector of claim 1, wherein the excitation assembly is implemented as a permanent magnet arrangement.

3. The detector of claim 1, wherein the excitation assembly is implemented as a coil arrangement.

4. The detector of claim 1, wherein the sensor assembly is implemented as a coil arrangement.

5. The detector of claim 4, wherein the sensor assembly includes at least one coil core which is configured such as to suppress induction of eddy currents in the coil core.

6. The detector of claim 5, wherein the coil core includes a stack of metal sheets that are electrically isolated from each other.

7. The detector of claim 1, wherein the sensor assembly is configured such as to acquire a magnetic field produced by the eddy current.

8. The detector of claim 1, wherein the shunt element is disposed adjacent to the induction element in a radial direction.

9. The detector of claim 1, and further comprising a material marker, and a sensor head arranged in fixed rotative engagement with the excitation assembly and constructed to scan the material marker, wherein the induction element is connected in fixed rotative engagement in the material marker, so that a rotational position of the induction element can be determined based on an output signal from the sensor head.

* * * * *